Jan. 6, 1953 — F. E. SMITH — 2,624,286
SUBMERGED PUMP AND MOTOR ASSEMBLY
Filed Oct. 12, 1948 — 2 SHEETS—SHEET 1

Inventor
Frederick E. Smith
By The firm of Charles M... Attys

Jan. 6, 1953　　　　　　　　F. E. SMITH　　　　　　　2,624,286
SUBMERGED PUMP AND MOTOR ASSEMBLY
Filed Oct. 12, 1948　　　　　　　　　　　　　　　2 SHEETS—SHEET 2
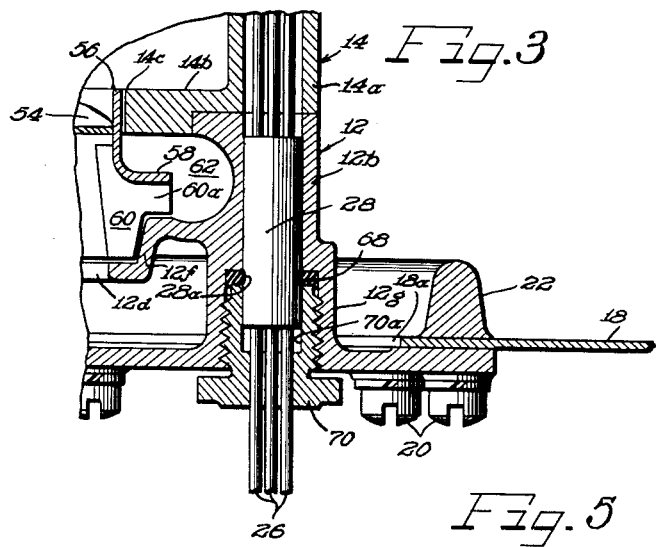
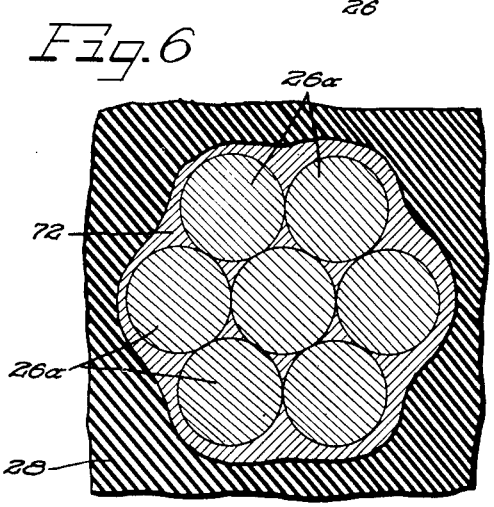
Inventor
Frederick E. Smith Patented Jan. 6, 1953

2,624,286

UNITED STATES PATENT OFFICE 2,624,286

SUBMERGED PUMP AND MOTOR ASSEMBLY

Frederick E. Smith, Cleveland Heights, Ohio, assignor to Thompson Products, Inc., Cleveland, Ohio, a corporation of Ohio Application October 12, 1948, Serial No. 54,185

4 Claims. (Cl. 103—87)

1

This invention relates to a pump and motor unit adapted to be mounted on a bottom wall of a tank or fuel cell in submerged relation in the cell and energized through wires extending through the bottom of the cell which are so sealed relative to the unit that leakage along the wires is eliminated.

Specifically, the invention relates to a wire seal and insulator for electric motor-driven fuel booster pumps of the submerged type.

The invention will hereinafter be specifically described as embodied in an electric motor-centrifugal type submerged booster pump unit for pumping fully liquid fuel to the inlet of a positive displacement pump in an aircraft fuel system, but it should be understood that the principles of this invention are widely applicable to many other constructions and therefore the scope of the invention is not limited to the specifically described and illustrated unit.

In accordance with this invention, an electric motor and centrifugal booster pump unit of the type adapted to be mounted on the bottom wall of a fuel cell to extend into the cell for total immersion therein has a portion of the wires for energizing the motor bonded in a synthetic rubber block or cartridge which snugly fits in a hollow mounting post of the unit. Since the wires are conventionally composed of insulated groups of twisted strands, leakage through the voids between the strands is eliminated by filling the voids with a metal such as tin or lead to form solid portions which are embedded in spaced relation in the block. To insure against leakage around the block, a plug is threaded into the post against a sealing ring which surrounds the block adjacent a shoulder in the post. The thus loaded ring forms a barrier against seepage through the post.

It is, then, an object of the invention to provide a motor and pump unit to be submerged within a fuel cell without leakage at the inlet for the power source.

Another object of this invention is to provide a pump and motor unit which may be easily inserted within a fuel cell and attached to a source of power.

A further object of this invention is to provide an insulating seal for electric lines which may be inserted within a casing submerged in a body of liquid.

Other and further objects of the invention will be apparent to those skilled in the art from the following detailed description of the annexed sheets of drawings which, by way of preferred example only, illustrate one specific embodiment of the invention.

2

On the drawings:

Figure 3 is an enlarged scale view of that portion of Figure 2 which shows the entry passage and the cartridge for the electric power line;

Figure 4 is a cross-sectional view of the cartridge or sealing block showing fragments of the electric line sealed therein;

Figure 5 is a transverse cross-sectional view taken substantially on the line V—V of Figure 4; and Figure 6 is a greatly enlarged transverse cross-sectional view of one of the electric power lines and showing the metal sealing of the strands thereof and the bonding of the metal-filled group of strands to the rubber block.

As shown on the drawings:

Figure 1:
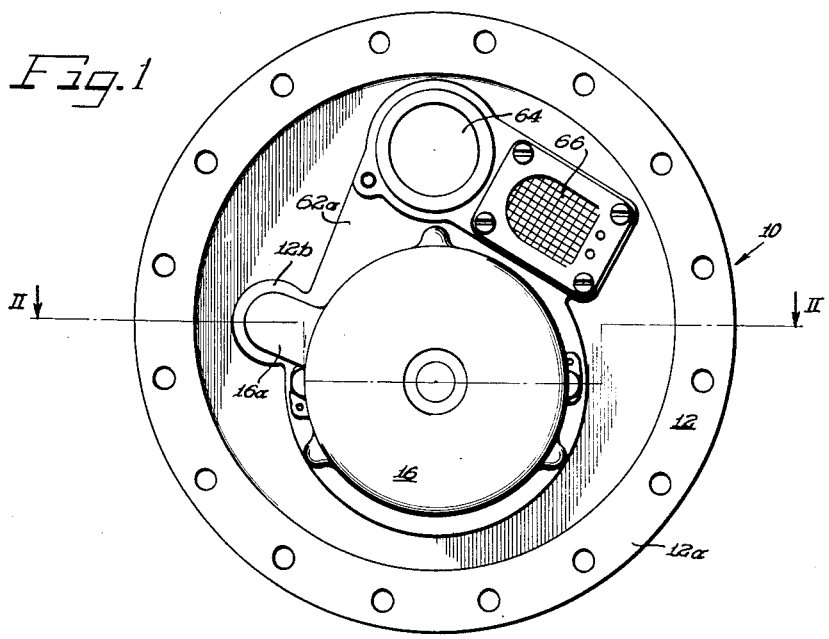
Figure 1 is a top plan view of the electric motor-centrifugal pump unit of this invention.
Figure 2:
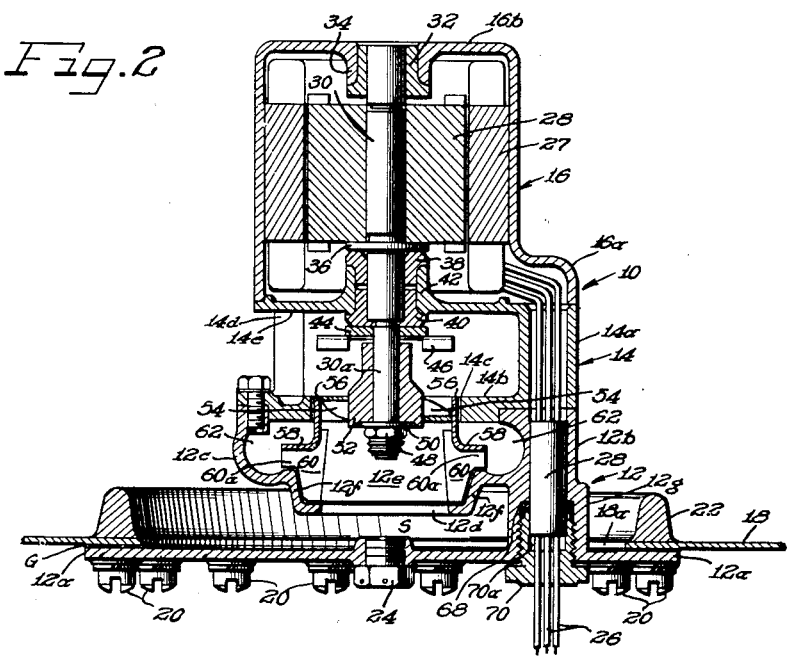
Figure 2 is a cross-sectional view of the motor pump unit taken substantially as indicated by the line II—II of Figure 1.

In Figures 1 and 2, the reference numeral 10 designates generally an electric motor and pump unit which has a base casting 12, an intermediate casting 14, and an upper casting 16. The lower or base casting 12 has a bottom flange portion 12a of circular configuration for mounting the unit 10 on the bottom wall 18 of a fuel cell. The casting 12 is secured to the bottom wall as by bolts 20 extending through the outer periphery of the flanged portion 12a and through the wall margin surrounding the aperture 18a in the bottom wall 18. These bolts are threaded into a mounting ring 22 seated on the inner side of the wall margin around the opening 18a. A gasket G is interposed between the casting flange 12a and the bottom wall to seal against leakage of fuel from the tank. The unit 10 is thus secured to the bottom wall of the cell and extends into the cell to be submerged in the fuel therein.

A sump S is formed within the mounting ring 22 on the base portion 12a of the casting 12. A plug 24 threaded into this base portion 12a may be removed to drain the sump S. The base casting 12 has an upstanding tubular leg or post portion 12b which acts as a conduit for the electric lines 26 and the cartridge 28 which will be described in detail later and carries a hollow ring portion 12c which has an opening 12d at its lower extremity for communication with the sump S thereby supplying a central inlet passage 12e with fuel.

The intermediate casting 14 is seated over the lower or base casting 12 and has an upstanding tubular portion 14a which fits over the tubular portion 12b of the casting 12. A lower plate portion 14b of the intermediate casting 14 closes the open top of the hollow ring 12c which communicates with the top of passage 12e and defines an outlet 14c. A gap 14d in the casting 14 between the plate 14b and a top plate 14e joins the interior of the cell with the opening 14c. The top plate 14e of the casting 14 comprises the lower wall of the upper electric motor casting 16.

The upper casting 16 is of cup-shaped configuration and in inverted position forms the side and top walls of the casing for the electric motor. Casting 16 has a tubular portion 16a for cooperating with the portions 14a on casting 14 and the portion 12b on casting 12 to form the completed conduit for the electric lines 26 to the electric motor.

The field coil or stator 27 of the motor, such as, for example, an induction motor, is carried in the motor casing or upper casting 16 in spaced relation beneath the top 16b thereof. An armature or rotor 28 of the electric motor is disposed within the stator 27 and is supported in spaced relation from the ends of the motor casing 16 on a shaft 30 which is rotatably carried at its upper end in a plain bearing such as a graphitic carbon ring 32 which is mounted in a sleeve 34 in the upper wall 16b of the casting 16.

The shaft 30 has a collar or affixed thrust washer 36 adjacent and below the rotor 28. The thrust washer 36 acts on the top of a plain bearing 38 which is in spaced relationship with a lower plain bearing 40, both of which are pressed into a sleeve 42 in the top portion of the casting 14 in spaced relationship. A lower thrust washer 44 is located about the shaft 30 adjacent and below the lower plain bearing 40. The washer 44 acts on a propeller spiner 46 which is secured to a reduced-diameter portion 30a of the shaft 30. The utility of the propeller spinner 46 will be explained in detail later. The lower extremity of the reduced-diameter portion 30a of the shaft 30 is threaded to receive a nut 48 and thrust washer 50 which secures a hub portion 52 of the pump impeller mechanism to the shaft between the propeller spinner 46 and the lower extremity of the reduced-diameter shaft portion 30a.

Spirally shaped blades 54 are integral with the impeler hub section 52 to form an axial flow impeller. The outer edges of these blades 54 are joined integrally with a cylindrical shroud 56. The cylindrical shroud 56 is provided with an annular flange 58 carrying a ring of depending impeller vanes 60 in the passage 12e. The vanes 60 are greatly elongated in the axial direction, extending from the pump inlet 12d to a point within the area of the cylindrical shroud 56. The outer ends of the vanes 60 have close-running clearance relation with the sloping wall portion 12f of the casting 12. At the point where the casting wall flares outwardly to form a volute chamber 62 in the casing ring 12c, the impeller vanes 60 are elongated to form tangentially inclined pumping vanes 60a.

The pumping vanes 60a with the shroud 58 and with the casting portion 12f form impeller passages communicating at their outer ends with the volute chamber 62 and at their inner ends with the pumping chamber 12e.

Liquid fuel in the cell and sump S enters the pump through the opening 12d into the pumping chamber 12e and is pumped by the vanes 60 into the volute 62. Volute 62 has a discharge portion 62a (Figure 1) through which the fuel flows to a fuel line 64 where it is passaged to the engine driven fuel pump. During times of engine operation when the motor pump unit 10 is not being operated, the vacuum created by the positive displacement fuel pump will passage fuel through the fuel line 64 drawing its supply through a screened bypass valve 66 (Figure 1) and also through the more restricted passages of the non-operating booster pump.

During operation of the motor pump unit when the impeller vanes 60 pump liquid fuel into the volute 62, they also create a violent agitation of the liquid in the pumping chamber 12e causing the formation of bubbles either by the extraction or collection of dissolved and entrained gases or by evaporation of the liquid. The aforementioned bubbles, being lighter in weight, gather near the axis of rotation of the impeller surrounding the hub 52 of the impeller. The spirally shaped impeller blades 54, being rotated by the motor shaft 30, propel the bubbles upwardly toward the propeller blades 46 which disperse the bubbles out through the gap 14d, so that they will not collect on the under side of the motor casing.

As previously mentioned, the tubular portions 12b, 14a and 16a of their respective castings cooperate to form a conduit for the wires leading from the electric power source to the motor. The cartridge 28 which insulates as well as separates the wires 26 and which provides a fluid seal for the aforesaid conduit is located in the lower portion of the tubular section 12b in the casting 12.

The construction and location of the cartridge may best be understood with reference to Figures 3, 4, 5 and 6, wherein it is shown that an O ring 68 is located about the cartridge 28 to rest within the tubular portion 12b at the end of a larger diameter internally threaded portion 12g of the casting 12. The O ring 68 is held in position and compressed therein by an internally apertured plug member 70 which is threaded into the portion 12g and which accommodates the lower end of the cartridge 28 in its central cavity 70a. The O ring, when compressed by the plug member 70, is deflected to seal the cartridge 28 in the internally threaded portion 12g of the tubular section 12b. The cartridge 28, being made of a material such as synthetic rubber which has good insulating characteristics as well as sealing characteristics, is bulged inwardly (as denoted by the number 28a) by the O ring 68.

The electric wires 26 are of conventional construction, each being formed of a plurality of copper wire strands 26a (Figure 6) and are insulated as by the rubber insulation 26b. A section of wire to be covered by the cartridge 28 is stripped of its insulation 26b and the strands 26a are covered with a molten metal such as tin 72 which fills all of the voids about the wire strands 26a to form an impervious solid section. The cartridge 28 of synthetic rubber or the like is then molded about the bared and tinned portion of the wires, the mold being of a length sufficient to cover the ends of the wire insulation 26b next to the bared portion of the wires. Thus, as shown in Figure 4, the cartridge 28 insulates the tinned wire sections and also encompasses parts of the insulated sections of the wires 26. The molded cartridge 28, in addition to insulating the wires 26, also keeps them in spaced relation with respect to each other as shown in Figure 5. This aids greatly in tracing and untangling wires which are ot be connected in the motor and to the electric power source.

From the foregoing, it can be understood that there is now provided an electric motor pump unit which can be submerged within a body of fuel in a cell and which is encased in a plurality of castings which, when conventionally secured to each other, also form a passage or conduit for electric power lines leading to the electric motor. There is also provided a cartridge which separates the electric lines, seals and insulates them from contact with water which may collect from the fuel in the conduit. It is to be further understood that the utility of such a cartridge is not restricted to use in a motor pump unit which is submerged in a fuel cell, but that various details of construction may be varied through a wide range without departing from the principles of this invention and it is, therefore, not the purpose to limit the patent granted hereon otherwise than necessitated by the scope of the appended claims.

I claim as my invention:

1. A booster pump unit adapted for mounting in a fuel cell which comprises a base plate adapted to span an opening in a cell wall and to be attached to the wall around the opening, a hollow upstanding post integral with said base plate, a pump casing carried by said post in spaced relation above the central portion of the base plate, said casing having an open bottom, an open top, and an annular pumping chamber between the open top and open bottom, an intermediate casting on the top of said post having a registering hollow post portion and spaced top and bottom plate-like walls, said bottom wall closing the top of said open topped pump casing and providing an outlet passageway for the pump casing in spaced aligned relation with the open bottom of the casing, a motor casing mounted on said intermediate casing and having a hollow tubular portion aligned with the hollow post of the intermediate casing, said top wall of the intermediate casing closing said motor casing, a motor in said motor casing having a rotor shaft depending into the pump casing, a pump impeller on said motor shaft for propelling fluid from the open bottom of the pump casing into the annular pumping chamber and for releasing gases and bubbles from the fluid, screw means on said pump impeller for flowing gaseous material into the space between the top and bottom plates of the intermediate casing, motor-energizing wires extending through the aligned post portions into the motor casing, said post portion on the base plate having an internal shoulder and a threaded end portion, a block of plastic insulating material receiving said wires therethrough in spaced bonded relation, a seal ring surrounding said block adjacent said shoulder, and a plug threaded into the threaded portion of the post receiving an end portion of the block and the wires, said plug acting against said seal ring to deform the ring into sealing relation with the block.

2. A pump and motor unit comprising a first casting having a mounting plate portion, a hollow post portion, and a pump casing portion carried by said post portion in spaced relation from the base portion, a second casting having a hollow post portion mounted on and aligned with the post portion of the first casting and having plate walls projecting into the pump casing and in spaced relation above the pump casing, a third casting having a tubular portion mounted on and aligned with the hollow post of the second casting and having an open bottom closed by the top plate of the second casting, a motor in said third casting having wires extending through the aligned hollow tubular and post portions of the three castings and through the mounting base, a synthetic rubber block receiving said wires therethrough in insulated bonded relationship and snugly seated in the hollow post, and plug means threaded into the base plate for holding the block in the post.

3. A pump and motor unit adapted for mounting in a fuel cell which comprises, a base plate adapted to span an opening in a cell wall and to be attached to the wall around the opening, a hollow upstanding post integral with said base plate and opening through the base plate to provide a passageway, a pump casing on said base plate having an open top and bottom with an annular pumping chamber therebetween said open bottom being spaced from the central portion of the base plate, a motor support casing on said pump casing and having a hollow post portion registering with the hollow upstanding post on the base plate and extending the passageway from the base plate, a motor casing having an open bottom mounted on and closed by said support casing and providing a chamber communicating with the passageway, motor energizing wires extending through said passageway into said chamber, a block of plastic insulating material receiving said wires therethrough in spaced bonded relation, a seal ring surrounding said block, a shoulder in said passageway receiving said seal ring thereagainst, and a plug threaded into the hollow post receiving an end portion of the block and acting against said seal ring to deform the ring into sealing relation with the block and shoulder.

4. A pump and motor unit comprising a first casting having a mounting plate portion, a hollow post portion and a pump casing portion in spaced relation above the base portion, a second casting having a hollow post portion mounted on and aligned with the post portion of the first casting and providing a motor support, said hollow post portions of the first and second castings providing a passageway, a third casting having an open bottom closed by the second casting and defining a motor compartment communicating with said passageway provided by the hollow post portions, a motor in said third casting having wires extending through the passageway and through the mounting plate portion, a block of plastic insulating material receiving the wires therethrough in insulated bonded relationship and snugly seated in said passageway, and plug means holding the block in the passageway in sealed relation.

FREDERICK E. SMITH.

REFERENCES CITED

The following references are of record in the file of this patent:

UNITED STATES PATENTS

| Number | Name | Date |
| --- | --- | --- |
| 608,412 | Patten et al. | Aug. 2, 1898 |
| 1,027,404 | Deibel | May 28, 1912 |
| 1,113,138 | Penote | Oct. 6, 1914 |
| 1,267,832 | Wilkinson | May 28, 1918 |
| 1,693,365 | Boyle | Nov. 27, 1928 |
| 2,161,447 | Bishop | June 6, 1939 |
| 2,227,954 | Bissell | June 7, 1941 |
| 2,310,423 | Gold | Feb. 9, 1943 |
| 2,320,708 | Yost | June 1, 1943 |
| 2,361,747 | Curtis | Oct. 31, 1944 |
| 2,379,133 | Curtis | June 26, 1945 |
| 2,393,935 | Scott | Jan. 29, 1946 |
| 2,419,592 | Richardson | Apr. 29, 1947 |
| 2,463,231 | Wyatt | Mar. 1, 1949 |